US008964537B2

(12) United States Patent
Brolin

(10) Patent No.: US 8,964,537 B2
(45) Date of Patent: Feb. 24, 2015

(54) METHOD AND SYSTEM FOR EGRESS POLICY INDICATIONS

(75) Inventor: Stephen J. Brolin, Livingston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 588 days.

(21) Appl. No.: 13/076,009

(22) Filed: Mar. 30, 2011

(65) Prior Publication Data

US 2012/0250502 A1  Oct. 4, 2012

(51) Int. Cl.
*G01R 31/08* (2006.01)
*H04L 12/833* (2013.01)

(52) U.S. Cl.
CPC ..................... *H04L 47/31* (2013.01)
USPC ........................ 370/230; 709/232

(58) Field of Classification Search
CPC ....................................... H04L 47/10
USPC ............................ 370/230–235; 709/232–236
See application file for complete search history.

(56) References Cited

U.S. PATENT DOCUMENTS

| | | | |
|---|---|---|---|
| 7,706,363 B1 * | 4/2010 | Daniel et al. .................. | 370/389 |
| 2006/0291378 A1 | 12/2006 | Brotherson et al. | |
| 2009/0073988 A1 | 3/2009 | Ghodrat et al. | |
| 2010/0220724 A1 * | 9/2010 | Rabie et al. .................. | 370/392 |
| 2010/0306489 A1 | 12/2010 | Abts et al. | |
| 2011/0051723 A1 * | 3/2011 | Rabie et al. .................. | 370/389 |

OTHER PUBLICATIONS

United States Final Office Action; U.S. Appl. No. 13/076,119; pp. 21, Jan. 27, 2014.
United States Final Office Action; U.S. Appl. No. 13/076,097; pp. 21, Oct. 9, 2013.
United States Office Action; U.S. Appl. No. 13/076,119; pp. 16, Sep. 13, 2013.
United States Final Office Action; U.S. Appl. No. 13/076,097; pp. 10, May 14, 2014.

* cited by examiner

*Primary Examiner* — Jeffrey M Rutkowski
*Assistant Examiner* — Peter Mak
(74) *Attorney, Agent, or Firm* — Baker Botts L.L.P.

(57) ABSTRACT

According to one embodiment, a method may include assigning one egress profile identifier out of a plurality of egress profile identifiers to an Ethernet frame based at least on an egress connection identifier (eXid) tag of the Ethernet frame at a traffic manager, receiving the Ethernet frame at a switching element from the traffic manager, receiving metadata at the switching element from the traffic manager, the metadata comprising the assigned egress profile identifier, an internal class of service marker, and an internal congestion marker, and mapping the internal class of service marker and the internal congestion marker to a priority marker and an external congestion marker in the Ethernet frame based on the egress profile identifier.

21 Claims, 4 Drawing Sheets

METHOD AND SYSTEM FOR EGRESS POLICY INDICATIONS

TECHNICAL FIELD OF THE DISCLOSURE

The present disclosure relates generally to networked communications and, more particularly, to a method and system for providing egress policy indications using metadata in a network element.

BACKGROUND

A communication network may include network elements that route packets and/or frames through the network. In some network elements, frame processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation, switching, link aggregation, virtual LAN (VLAN) detection, and traffic management and shaping.

A network element may include one or more plug-in units (PIUs). A PIU may comprise a modular electronic device that provides any suitable network communication functionality. For example, a PIU may include, among other things, a switch (e.g., an Ethernet switch) for switching traffic through the network element and a traffic manager for shaping and/or policing network flows.

SUMMARY

According to one embodiment, a method may include assigning one egress profile identifier out of a plurality of egress profile identifiers to an Ethernet frame based at least on an egress connection identifier (eXid) tag of the Ethernet frame at a traffic manager, receiving the Ethernet frame at a switching element from the traffic manager, receiving metadata at the switching element from the traffic manager, the metadata comprising the assigned egress profile identifier, an internal class of service marker, and an internal congestion marker, and mapping the internal class of service marker and the internal congestion marker to a priority marker and an external congestion marker in the Ethernet frame based on the egress profile identifier.

One or more other technical advantages of the disclosure may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
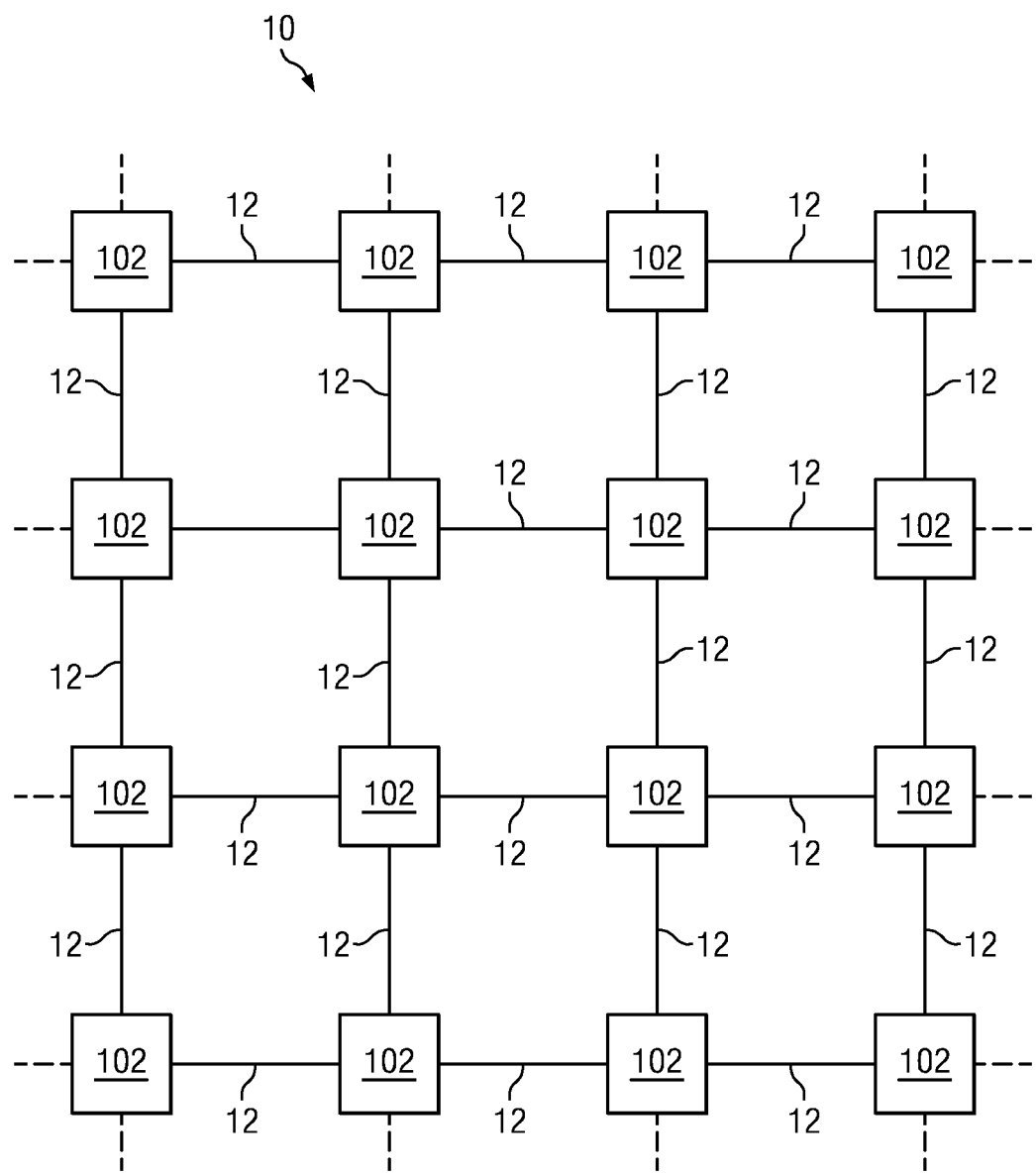
FIG. 1 illustrates a block diagram of an example communication network, in accordance with certain embodiments of the present disclosure.

FIG. 1 illustrates a block diagram of an example network 10, in accordance with certain embodiments of the present disclosure. Network 10 may include one or more transmission media 12 operable to transport one or more signals communicated by components of network 10. In certain embodiments, network 10 may carry Ethernet signals. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Ethernet communication protocol and the Internet Protocol (IP). Additionally, the traffic communicated in network 10 may be structured in any appropriate manner including, but not limited to, being structured in frames, packets, or an unstructured bit stream. As used herein, a "flow" may mean a sequence of packets, frames, cells, or any other segments of data communicated over a network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
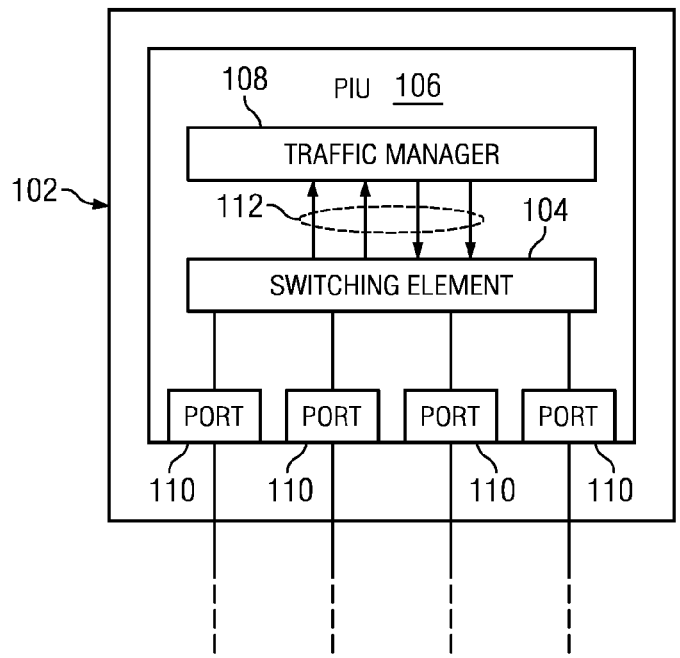
FIG. 2 illustrates a block diagram of an example network element, in accordance with certain embodiments of the present disclosure.

FIG. 2 illustrates a block diagram of network element 102, in accordance with certain embodiments of the present disclosure. As discussed above, each network element 102 may be coupled to one or more other network elements 102 via one or more transmission media 12.

Each network element 102 may generally be configured to receive data from and/or transmit data to one or more other network elements 102. In certain embodiments, network element 102 may comprise a switch configured to route data received by network element 102 to another device coupled to network element 102 (e.g., another network element 102 or one or more devices or clients coupled to the network element 102).

As depicted in FIG. 2, a network element 102 may include a plug-in unit (PIU) 106 with a plurality of ports 110. In some embodiments, ports 110 may be coupled to other components within network element 102. For example, an optical receiver in network element 102 may receive traffic in optical form from transmission line 12 and convert the traffic into electrical form, allowing the traffic to be communicated from the optical receiver to PIU 106 via port 110.

A PIU 106 may include any system, device, or apparatus having plug-in terminals so that some or all electrical connections of the PIU 106 can be made engaging the unit with a suitable socket of network element 102. A PIU may include any system, device, or apparatus or combination thereof to implement networking functions. As shown in FIG. 2, one example of a PIU 106 may include a switching element 104, a traffic manager 108, intra-PIU links 112, and a plurality of ports 110.

A port 110 may be communicatively coupled to a switching element 104 and may include any suitable system, apparatus, or device configured to serve as an interface between a switching element 104 and other devices within network element 102. A port 110 may be implemented using hardware, software, or any combination thereof. For example, a port 110 may comprise an Ethernet port or any other suitable port. Some of ports 110 may be interfaced to clients of a network provider (e.g., devices or networks, other than network elements 102, that are coupled to the network element 102), while other of ports 110 may be interfaced to the provider network (e.g., other network elements 102).

An intra-PIU link 112 may include any system, device, or apparatus configured to communicatively couple a switching element 104 to a traffic manager 108 and communicate information between a switching element 104 and its corresponding traffic manager 108. For example, an intra-PIU link 112 may include a metal wire, a printed wiring board path, or other suitable medium.

A traffic manager 108 may be communicatively coupled to switching element 104 on the same PIU 106 via intra-PIU links 112, and may include any suitable system, apparatus, or device configured to police and/or shape flows of traffic. Traffic shaping is the control of traffic flows in order to optimize or guarantee performance, improve latency, and/or increase usable bandwidth by delaying packets of traffic that meet certain criteria. More specifically, traffic shaping is any action on a flow of packets which manages the packets such that they conform to some predetermined constraint (e.g., a service-level agreement or traffic profile). Traffic policing is the process of monitoring network traffic for compliance with a service-level agreement and taking action to enforce such agreement. For example, in traffic policing, traffic exceeding a service-level agreement may be discarded immediately, marked as non-compliant, or left as-is, depending on an administrative policy and the characteristics of the excess traffic.

A switching element 104 may include any suitable system, apparatus, or device configured to receive ingress traffic via a port 110 and route such traffic to a particular egress port 110 based on analyzing the contents of the data (e.g., a destination address of a packet of traffic). For example, switching element 104 may comprise an Ethernet switch for switching Ethernet traffic through network element 102.

In addition, switching element 104 may include logic engines which may perform certain programmed functions on traffic as the traffic ingresses and egresses switching element 104. For example, an ingress logic engine may map external priority and congestion markers in an Ethernet frame to internal class-of-service and congestion markers for use in shaping and policing at traffic manager 108. In network element 102, traffic flows may require unique labels as they travel through various logic engines in a switching element 104. The label may identify the flow with sufficient resolution such that all packets of traffic with the same label undergo identical treatment in a logic engine. For example, an ingress logic engine may perform the above referenced mapping based on a unique label for each flow. Alternatively, to reduce the number of logic rules to be utilized by an ingress logic engine, each flow may be assigned a non-unique ingress profile identifier, and a particular ingress policy function may be implemented by an ingress logic engine based on the assigned non-unique ingress profile identifier instead of the unique flow identifier. Accordingly, the number of rules required to implement the ingress policy function may be a function of the number of ingress profile identifiers used rather than the number of unique flows passing through the ingress logic engine. Thus a large number of flows may be handled by the particular ingress logic engine with a relatively small number of rules. However, traditional network architectures do not provide such an efficient means by which to assign a profile identifier on egress. Thus, flow-based egress policies are traditionally implemented based on unique flow identifiers. Accordingly, traditional implementations of flow-based egress policies may require a large number of rules in order to classify a large number of unique flows through an egress logic engine of a switching element. Alternatively, policies may traditionally be assigned in a more restrictive manner, for example, based on a flow's ingress port or egress port.

Figure 3:
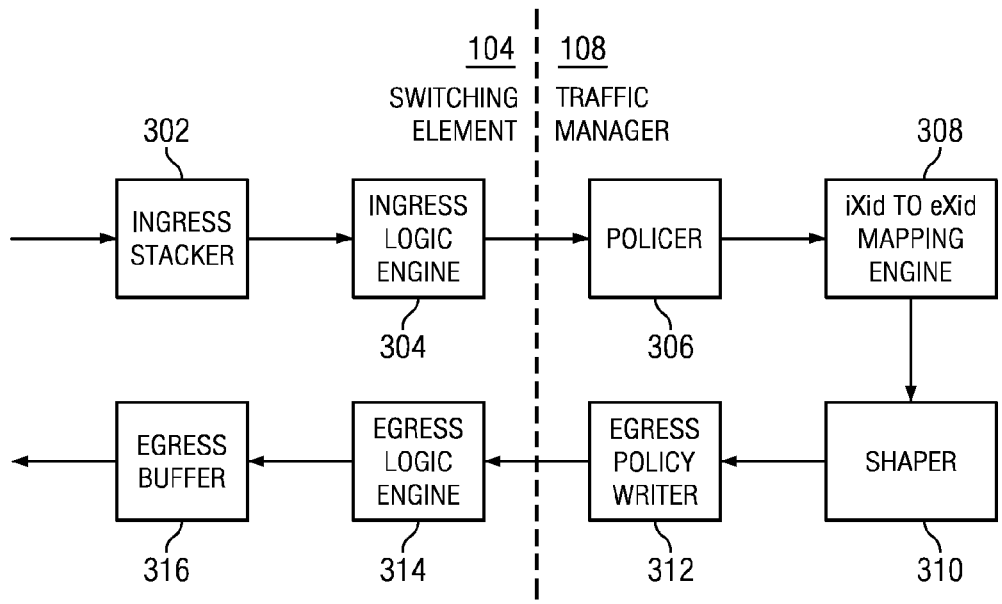
FIG. 3 illustrates a block diagram depicting an example implementation of an egress policy mapping, in accordance with certain embodiments of the present disclosure.

FIG. 3 illustrates a block diagram depicting an example implementation of an egress policy mapping performed in PIU 106, in accordance with certain embodiments of the present disclosure. In some embodiments, the functional blocks illustrated in FIG. 3 may be implemented partially or fully in software or firmware. Switching element 104 and traffic manager 108 may include processors and/or other integrated circuits that may be configured to execute such software or firmware.

Ethernet frames communicated in network 10 may be communicated to PIU 106 and enter switching element 104 via a port 110. If an Ethernet frame is ingressed from another network device on network 10 (e.g., another network element 102), the Ethernet frame may include a service VLAN tag, also referred to as an S-tag or generically as an outer VLAN tag. Each flow ingressed from another network device via a single port 110 in network element 102 may have an S-tag unique to the flows ingressed on that same port 110. An S-tag may include among other fields a three-bit priority (PRI) marker and a one-bit congestion forward indicator (CFI). S-tags may be used by service providers internally to their network while mixing traffic from client flows that already have an inner VLAN tag. Such Ethernet frames may also include a client VLAN tag, also referred to as an C-tag or an inner VLAN tag. The inner VLAN tag may include, among other fields, a PRI marker and a CFI marker.

Alternatively, if an Ethernet frame is ingressed from a client device coupled to network 10, the Ethernet frame may include an inner VLAN tag, but no S-tag. Each unique flow ingressed from a client via the same port 110 in network element 102 may have an inner VLAN tag unique to the flows ingressed on that same port 110.

At ingress stacker 302 of FIG. 3, another tag, which may be referred to as in ingress connection identifier (iXid) tag may be stacked (e.g., by switching element 104 or another component of network element 102) on an Ethernet frame. If an Ethernet frame includes an S-tag on ingress, the PRI marker and the CFI marker of the S-tag may be copied to the iXid tag, and the iXid tag may replace the S-tag. Alternatively, if an Ethernet frame does not include an S-tag on ingress, the PRI marker and the CFI marker of the inner VLAN tag may be copied to the iXid tag, and the iXid tag may simply be added to the Ethernet frame.

The iXid tag may be unique among all ingress flows and independent from the ingress and/or egress port 110 of the frame. A non-unique ingress profile identifier may be assigned to the Ethernet frame based on the unique iXid tag, and the ingress profile identifier may be used by switching element 104 to classify the Ethernet frame through the ingress logic engine 304 of switching element 104. For example, the ingress logic engine 304 of switching element 104 may perform a mapping of the PRI marker and the CFI marker inside the iXid tag of the Ethernet frame to a three-bit internal class-of-service (COS) marker and a one-bit internal congestion (CNG) marker based on the ingress profile identifier. Though CNG markers are described as one-bit markers in this disclosure, in some embodiments, CNG markers may be two-bit markers. In some embodiments, the assigned ingress profile identifier for an Ethernet frame in a flow may be one out of thirty-two possible ingress profile identifiers. With thirty-two potential ingress profile identifiers, eight potential values for the three-bit PRI marker, and two potential values for the one-bit CFI marker, the ingress logic engine may implement the PRI/CFI to COS/CNG mapping for a large number of unique flows (e.g., two thousand unique flows) with a total of only five-hundred and twelve rules.

After the mapping, switching element 104 may communicate the Ethernet frame along with the COS and CNG markers to traffic manager 108 for policing and shaping.

At policer 306 of FIG. 3, traffic manager 108 may perform policing based on the iXid tag, the COS marker, and the CNG marker. Then, as indicated by the iXid-to-eXid mapping engine 308, traffic manager 108 may swap the iXid tag for an egress connection ID (eXid) tag. The eXid tag may occupy the same position as the iXid tag it replaced. The eXid tag may be unique among all egress flows and independent from the ingress and/or egress port 110 of the frame. At shaper 310, traffic manager 108 may also perform shaping based on the eXid tag, the COS marker, and the CNG marker.

At the egress policy writer 312 illustrated in FIG. 3, traffic manager 108 may assign an egress policy to the Ethernet frame. Traditional network architectures do not provide an efficient means by which to assign a non-unique profile identifier to an egress flow. Thus, egress policies are traditionally implemented based on unique flow identifiers such as a unique eXid tag. Accordingly, traditional implementations of egress policies may require either restrictive port-based assignments or a large number of flow-based rules in order to classify a large number of unique flows through an egress logic engine of a switching element. However, traffic manager 108 may assign egress policy information, including a non-unique egress profile identifier, to an Ethernet frame based on the unique eXid tag of the Ethernet frame. Egress policy writer 312 may write the egress policy information to a metatag attached to the Ethernet frame. When an Ethernet frame enters network element 102, network element 102 may attach a metatag to the Ethernet frame. The metatag may include an array of bits that may carry information about the Ethernet frame (i.e., metadata) for processing at, for example, switching element 104. The information carried by a metatag may be referred to as metadata. Though a metatag may be designated for a specific purpose, the metatag's bits may be appropriated for other purposes when those bits are otherwise unused. For example, a metatag that is attached to the Ethernet frame may include metadata that is used on ingress but not on egress. For the purpose of this disclosure, metadata that is used on ingress but not on egress may be referred to as "ingress metadata." An example of ingress metadata may be source(mod) and source(port) information, typically thirteen bits in length. Source(mod) and source(port) information may indicate the module and port where a specific flow entered the system. This information may be used by switching element 104 and/or traffic manager 108 on ingress, but may serve no purpose in the egress direction. Accordingly, an egress profile identifier, along with the COS marker, the CNG marker, and a class-of-service upgrade (COS-upgrade) marker may be written over the source(mod) and source(port) metadata at traffic manager 108. Traffic manager 108 may include a table containing an egress profile identifier assignment and a COS-upgrade marker assignment for each unique flow as identified by its eXid tag. In some embodiments, the egress profile identifier may be a five-bit number with thirty-two potential settings, the COS maker may be a three-bit number with eight potential settings, the CNG marker may be a one-bit number with two potential settings, and the COS-upgrade marker may be a one-bit number with two potential settings.

After writing the egress policy information to the metatag, traffic manager 108 may communicate the Ethernet frame and the metatag containing the egress policy information to switching element 104. At egress logic engine 314 shown in FIG. 3, the egress profile identifier may be used by switching element 104 to classify all egress flows through the egress logic engine 314 of switching element 104. The egress policy may be implemented by mapping the COS marker and the CNG marker to the PRI marker and CFI marker in the eXid tag of the Ethernet frame based on the selected egress profile identifier. This mapping is explained in greater detail in conjunction with FIG. 4.

The egress logic engine 314 shown in FIG. 3 may also place the Ethernet frame in the egress buffer 316 based on the COS marker. Ethernet frames with higher COS marker values may be placed into a higher priority queue of the egress buffer 316 than of Ethernet frames with lower COS marker values. Some embodiments may also place the Ethernet frame in a queue in egress buffer 316 based on the COS-upgrade marker. For example, if the COS marker indicates a class level of four, and the COS-upgrade marker is not set to allow an upgrade, switching element 104 may place the Ethernet frame into a queue in egress buffer 316 with a priority level of four. But if the COS marker indicates a class level of four, and the COS-upgrade marker is set to allow a COS upgrade, switching element 104 may place the Ethernet frame into a queue in egress buffer 316 with a priority level of five. The multiple queues of an egress buffer 316 may be serviced based at least upon the level of priority for each queue. For example, a strict priority scheduler may schedule transmission of Ethernet frames in various queues based solely on the priority level of the queues.

At egress from network element 102, the eXid tag may either be replaced or dropped. If an Ethernet frame is egressing to another device on network 10 (e.g., another network element 102), the eXid tag may be translated to an S-tag with the same PRI and CFI marker as the eXid tag. Alternatively, if an Ethernet frame is egressing to a client device coupled to network 10, the eXid may be stripped from the Ethernet frame.

Figure 4:
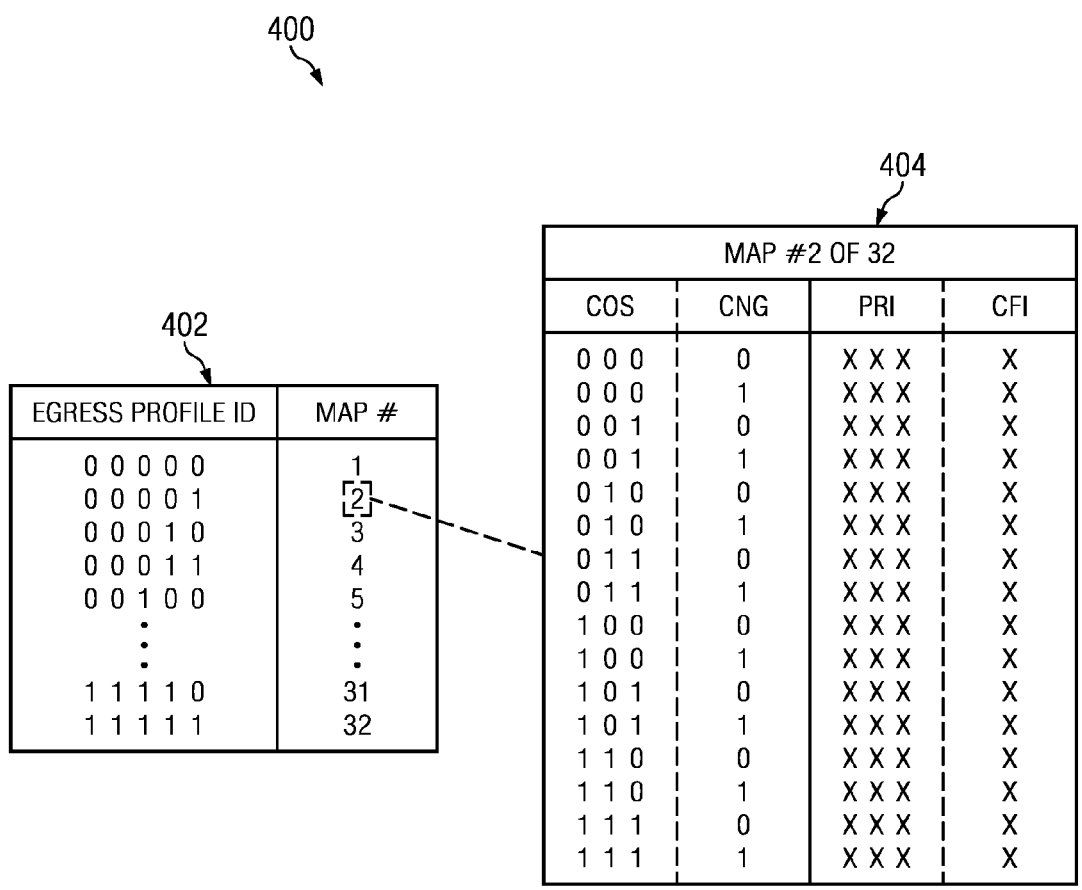
FIG. 4 illustrates a block diagram depicting an egress policy mapping, in accordance with certain embodiments of the present disclosure.

FIG. 4 illustrates a block diagram depicting an egress policy mapping 400, in accordance with certain embodiments of the present disclosure. As illustrated in table 402 of FIG. 4, the egress profile identifier may be a five-bit number with one of thirty-two potential settings. Based on which one of the thirty-two potential identifiers is selected, the egress logic engine of switching element 104 may access the corresponding map out of the thirty-two maps. As shown in example map 404 of FIG. 4, there may be a PRI setting and a CFI setting for each potential combination of the COS marker and the CNG marker. Each map may be programmed into a memory associated with switching element 104.

Use of the egress profile identifier by an egress logic engine in a switching element has the distinct advantage of allowing the processing of a large number of flows in a switching element of acceptable cost. In some embodiments, the COS marker may be a three-bit number with eight potential settings, and the CNG marker may be a one-bit number with two potential settings. Thus there may be sixteen potential combinations for the COS marker and the CNG marker. If the COS/CNG to PRI/CFI map were implemented for each of two-thousand unique flows (as identified by their eXid tags for example), egress logic engine 314 of switching element 104 would require thirty-two thousand rules to implement the egress policy. However, selecting one of thirty-two COS/CNG to PRI/CFI maps based on a five-bit egress profile identifier allows egress logic engine 314 to handle a large number of flows (e.g., two thousand or more unique flows) with only five-hundred and twelve rules. Thus, switching element 104 may not require a large amount of costly memory to store a large amount of rules. Appropriating the source (mod) and source(port) bits in the metatag, otherwise unused on egress, allows traffic manager 108 to communicate an assigned egress profile identifier to switching element 104 along with the COS marker and the CNG marker in order to implement the egress policy. The appropriation of the unused bits in the metatag also allows traffic manager 108 to indicate whether or not a particular Ethernet frame should be placed in a queue of the egress buffer based only on its COS marker or whether the Ethernet frame should receive a class of service upgrade.

Figure 5:
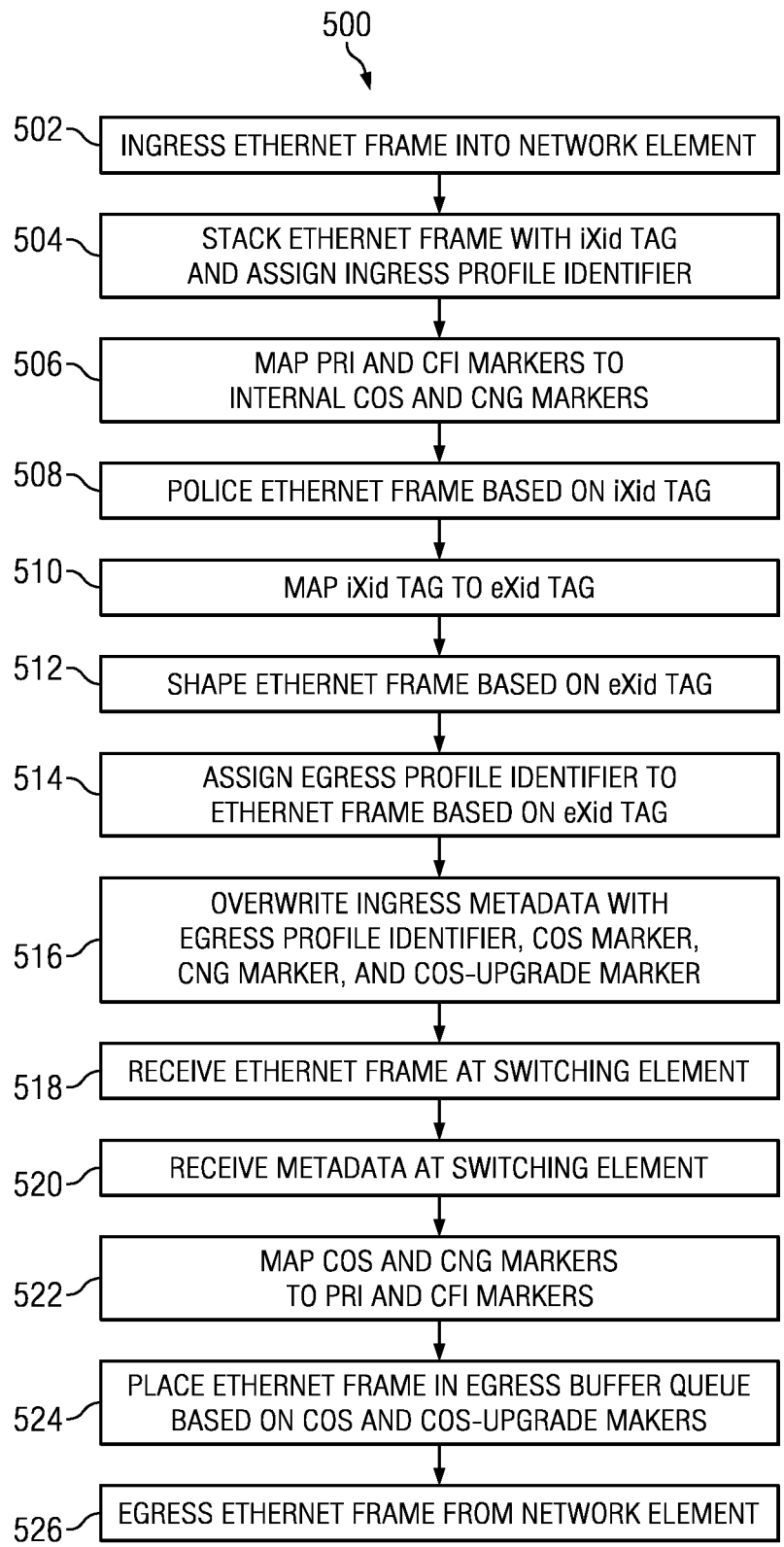
FIG. 5 illustrates a flow chart depicting an example method for implementing an egress policy mapping based on an egress profile identifier.

FIG. 5 depicts a flow chart of an example method 500 for implementing an egress policy mapping based on an egress profile identifier.

At step 502, an Ethernet frame communicated in network 10 may enter a network element 102.

At step 504, switching element 104 or another component of network element 102 may stack the Ethernet frame with an iXid tag that may be unique among all flows handled by network element 102 and independent from the ingress and/or egress port 110 of the Ethernet frame. If an Ethernet frame in ingressed from another network device and includes an S-tag on ingress, the PRI marker and the CFI marker of the S-tag may be copied to the iXid tag, and the iXid tag may replace the S-tag. Alternatively, if an Ethernet frame is ingressed from a client device and does not include an S-tag on ingress, the PRI marker and the CFI marker of an inner VLAN tag may be copied to the iXid tag, and the iXid tag may simply be added to the Ethernet frame. Switching element 104 or another component of network element 102 may also assign an ingress profile identifier to the Ethernet frame based on the Ethernet frame's unique iXid tag.

At step 506, ingress logic engine 304 of switching element 104 may map the three-bit PRI marker and the one-bit CFI marker in the iXid tag to a three-bit COS marker and a one-bit CNG marker based on the assigned ingress profile identifier. In some embodiments, the assigned ingress profile identifier for an Ethernet frame in a flow may be one out of thirty-two possible ingress profile identifiers. With thirty-two potential ingress profile identifiers, eight potential values for the three-bit PRI marker, and two potential values for the one-bit CFI marker, the ingress logic engine 304 may be capable of mapping PRI and CFI markers to the COS and CNG markers for a large number of unique flows (e.g., two thousand or more unique flows) with a total of only five-hundred and twelve rules. After the mapping, switching element 104 may communicate the Ethernet frame along with the COS and CNG markers to traffic manager 108 for policing and shaping at traffic manager 108.

At step 508, traffic manager 108 may police the Ethernet frame based on the iXid tag, the COS marker, and the CNG marker. At step 510, traffic manager 108 may map the iXid tag to an eXid tag, replacing the iXid tag with the eXid tag. The eXid tag may occupy the same position as the iXid tag it replaced and may be unique among all egress flows and independent from the ingress and/or egress port 110 of the frame. At step 512, traffic manager 108 may perform shaping based on the eXid tag, the COS marker, and the CNG marker.

At step 514, traffic manager 108 may assign an egress profile identifier to the Ethernet frame based on the unique eXid tag of the Ethernet frame. Traffic manager 108 may also assign a COS-upgrade marker to the Ethernet frame based on the eXid tag of the Ethernet frame. At step 516, traffic manager 108 may overwrite ingress metadata with the assigned egress profile identifier, the COS marker, the CNG marker, and the assigned COS-upgrade marker. For example, traffic manager 108 may write the egress profile identifier, the COS marker, the CNG marker, and the assigned COS-upgrade marker over the source(mod) and source(port) markers, typically thirteen bits in length. The source(mod) and source (port) markers may indicate the module and port where a specific flow entered the system. This metadata may be used by switching element 104 and/or traffic manager 108 on ingress, but may serve no purpose in the egress direction. Accordingly, traffic manager 108 may appropriate bits in the metatag holding the source(mod) and source(port) information as a means for communicating the egress profile identifier as well as the COS marker, the CNG marker, and the COS-upgrade marker to the egress logic engine 314 of switching element 104.

At step 518, switching element 104 may receive the Ethernet frame from traffic manager 108, and at step 520, switching element 104 may receive the metadata containing the egress profile identifier as well as the COS marker, the CNG marker, and the COS-upgrade marker from traffic manager 108. The metatag containing the egress profile identifier as well as the COS marker, the CNG marker, and the COS-upgrade marker may be attached to the Ethernet frame, and accordingly, steps 518 and 520 may be performed simultaneously.

At step 522, egress logic engine 314 may map the three-bit COS marker and the one-bit CNG marker to the three-bit PRI marker and the one-bit CFI marker in the eXid tag of the Ethernet frame based on the assigned egress profile identifier. In some embodiments, the egress profile identifier may be a five-bit number. Accordingly, the assigned egress profile identifier for an Ethernet frame in a flow may be one out of thirty-two possible ingress profile identifiers. With thirty-two potential egress profile identifiers, eight potential values for the three-bit COS marker, and two potential values for the one-bit CNG marker, the egress logic engine 314 may be capable of mapping COS and CNG markers to PRI and CFI markers for a large number of unique flows (e.g., two thousand or more unique flows) with a total of only five-hundred and twelve rules. Comparatively, traditional network architectures may use the unique eXid tag to classify flows through an egress logic engine. With eight potential values for the three-bit COS marker, and two potential values for the CNG marker, an egress logic engine classifying on the unique eXid tags of two thousand unique flows may require thirty-two thousand rules. Accordingly, use of an egress profile identifier to classify flows through egress logic engine 314 results in a significant reduction of the number of rules that are required by the egress logic engine 314.

At step 524, switching element 104 may place the Ethernet frame in a queue in egress buffer 316 based on the COS marker and the COS-upgrade markers. Ethernet frames with higher COS marker values may be placed into a higher priority queue of the egress buffer 316 than of Ethernet frames with lower COS marker values. For example, if the COS marker indicates a class level of four, and the COS-upgrade marker is not set to allow an upgrade, switching element 104 may place the Ethernet frame into a queue in egress buffer 316 with a priority level of four. But if the COS marker indicates a class level of four, and the COS-upgrade marker is set to allow a COS upgrade, switching element 104 may place the Ethernet frame into a queue in egress buffer 316 with a priority level of five. Some alternative embodiments may not include a COS upgrade marker, and switching element 104 in those alternative embodiments may place the Ethernet frame in egress buffer queue 316 based on the COS marker. The multiple queues of egress buffer 316 may be serviced based at least upon the level of prior for each queue. For example, a strict priority scheduler may schedule transmission of Ethernet frames in various queues based solely on the priority level of the queues.

At step 526, network element 102 may egress the Ethernet frame. For Ethernet frames egressing to another device on network 10 (e.g., another network element 102), the eXid tag may be translated to an S-tag. Alternatively, for Ethernet frame egressing to a client device coupled to network 10, the eXid may be stripped from the Ethernet frame.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. For example, logic may perform the functions of ingress stacker 302, ingress logic engine 304, egress logic engine 314, and egress buffer in switching element 104, as well as the functions of policer 306, iXid-to-eXid mapping engine 308, shaper 310, and egress policy writer 312 of traffic manager 108. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   assigning one egress profile identifier out of a plurality of egress profile identifiers to an Ethernet frame based at least on an egress connection identifier (eXid) tag of the Ethernet frame at a traffic manager;
   receiving the Ethernet frame at a switching element from the traffic manager;
   receiving metadata at the switching element from the traffic manager, the metadata comprising:
      the assigned egress profile identifier;
      an internal class of service marker; and
      an internal congestion marker, wherein at least a portion of the egress profile identifier, the internal class of service marker, and the internal congestion marker is written over ingress metadata at the traffic manager, the ingress metadata having a use on ingress at ingress ports but not having a use on egress at egress ports; and
   mapping the internal class of service marker and the internal congestion marker to a priority marker and an external congestion marker in the Ethernet frame based on the egress profile identifier.

2. A method according to claim 1, further comprising placing the Ethernet frame in an egress buffer queue based at least on the internal class of service marker.

3. A method according to claim 2, wherein the metadata further comprises a class of service upgrade marker.

4. A method according to claim 3, wherein placing the Ethernet frame in the egress buffer queue is further based on the class of service upgrade marker.

5. A method according to claim 1, further comprising:
   at the switching element, stacking the Ethernet frame with an internal connection identifier (iXid) tag upon ingress to the switching element; and
   at the traffic manager:
      policing the Ethernet frame based on the iXid tag;
      mapping the iXid tag to the eXid tag; and
      shaping the Ethernet frame based on the eXid tag.

6. A method according to claim 1, wherein the ingress metadata includes a source(mod) marker and a source(port) marker.

7. A method according to claim 1, wherein mapping rules for each of the plurality of egress profiles are stored in a memory of the switching element.

8. A network element comprising:
a traffic manager configured to:
assign one egress profile identifier out of a plurality of egress profile identifiers to an Ethernet frame based at least on an egress connection identifier (eXid) tag of the Ethernet frame;
write the assigned egress profile identifier, an internal class of service marker, and
an internal congestion marker to a metatag, wherein at least a portion of the egress profile identifier, the internal class of service marker, and the internal congestion marker is written over ingress metadata at the traffic manager, the ingress metadata having a use on ingress at ingress ports but not having a use on egress at egress ports; and
a switching element configured to:
receive the Ethernet frame from the traffic manager;
receive the metatag from the traffic manager; and
map the internal class of service maker and the internal congestion marker to a priority marker and an external congestion marker in the Ethernet frame based on the egress profile.

9. A network element according to claim 8, the switching element further configured to place the Ethernet frame in an egress buffer queue based at least on the internal class of service marker.

10. A network element according to claim 9, the traffic manager further configured to write a class of service upgrade marker to the metatag.

11. A network element according to claim 10, the switching element further configured to place the Ethernet frame in the egress buffer queue based further on the class of service upgrade marker.

12. A network element according to claim 8, wherein:
the switching element is further configured to stack the Ethernet frame with an internal connection identifier (iXid) tag upon ingress to the switching element; and
the traffic manager is further configured to:
police the Ethernet frame based on the iXid tag;
map the iXid tag to the eXid tag; and
shape the Ethernet frame based on the eXid tag.

13. A network element according to claim 8, wherein the ingress metadata includes a source(mod) marker and a source(port) marker.

14. A network element according to claim 8, the switching element further configured to store mapping rules for each of the plurality of egress profiles.

15. A non-transitory computer readable medium comprising logic that is operable, when executed, to:
assign one egress profile identifier out of a plurality of egress profile identifiers to an Ethernet frame based at least on an egress connection identifier (eXid) tag of the Ethernet frame at a traffic manager;
receive the Ethernet frame at a switching element from the traffic manager;
receive metadata at the switching element from the traffic manager, the metadata comprising:
the assigned egress profile identifier;
an internal class of service marker; and
an internal congestion marker, wherein at least a portion of the egress profile identifier, the internal class of service marker, and the internal congestion marker is written over ingress metadata at the traffic manager, the ingress metadata having a use on ingress at ingress ports but not having a use on egress at egress ports; and
map the internal class of service marker and the internal congestion marker to a priority marker and an external congestion marker in the Ethernet frame based on the egress profile identifier.

16. A non-transitory computer readable medium according to claim 15, the logic further operable, when executed, to place the Ethernet frame in an egress buffer queue based at least on the internal class of service marker.

17. A non-transitory computer readable medium according to claim 16, wherein the metadata further comprises a class of service upgrade marker.

18. A non-transitory computer readable medium according to claim 17, wherein placing the Ethernet frame in the egress buffer queue is further based on the class of service upgrade marker.

19. A non-transitory computer readable medium according to claim 15, the logic further operable, when executed, to:
stack the Ethernet frame with an internal connection identifier (iXid) tag at the switching element upon ingress of the Ethernet frame to the switching element;
police the Ethernet frame at the traffic manager based on the iXid tag;
map the iXid tag to the eXid tag at the traffic manager; and
shape the Ethernet frame based on the eXid tag at the traffic manager.

20. A non-transitory computer readable medium according to claim 15, wherein the ingress metadata includes a source (mod) marker and a source(port) marker.

21. A non-transitory computer readable medium according to claim 15, wherein mapping rules for each of the plurality of egress profiles are stored in a memory of the switching element.

* * * * *